(12) United States Patent
Ryali et al.

(10) Patent No.: US 8,774,760 B2
(45) Date of Patent: Jul. 8, 2014

(54) METHOD AND SYSTEM FOR PROVIDING REAL-TIME ALERT NOTIFICATION

(75) Inventors: Venkata Murali Krishna Ryali, Karnataka (IN); Vijay Anand Naganathan, Tamil Nadu (IN)

(73) Assignee: Infosys Limited (IN)

( * ) Notice: Subject to any disclaimer, the term of this patent is extended or adjusted under 35 U.S.C. 154(b) by 210 days.

(21) Appl. No.: 12/901,657

(22) Filed: Oct. 11, 2010

(65) Prior Publication Data
US 2012/0015630 A1    Jan. 19, 2012

(30) Foreign Application Priority Data
Jul. 19, 2010    (IN) .......................... 2044/CHE/2010

(51) Int. Cl.
*H04M 1/66*    (2006.01)
*H04M 1/68*    (2006.01)
*H04M 3/16*    (2006.01)

(52) U.S. Cl.
USPC .................. 455/410; 455/452.1; 455/435.1; 455/466; 726/2; 726/4; 726/5; 726/9

(58) Field of Classification Search
USPC ............... 455/435.1, 410; 726/2–5, 9, 16–21
See application file for complete search history.

(56) References Cited

U.S. PATENT DOCUMENTS

| | | | |
|---|---|---|---|
| 2004/0037306 A1* | 2/2004 | Khan et al. .................... | 370/437 |
| 2005/0027676 A1* | 2/2005 | Eichstaedt et al. ............... | 707/1 |
| 2009/0042537 A1* | 2/2009 | Gelbman et al. ............. | 455/406 |

* cited by examiner

*Primary Examiner* — Ajit Patel
(74) *Attorney, Agent, or Firm* — Cantor Colburn LLP

(57) ABSTRACT

A system and method for providing real-time alert message to one or more subscribers in a service provider network is provided. The service provider network may be an enterprise, a communication service provider or a hosted service. A throttler application receives request for alert message generated by an alert originator application and relays the request to a gateway of an alert notification module. A token associated with the request is validated. Based on token parameter values which includes subscriber identities, delivery channel specifications, alert originator application priorities and end point identities, the alert message is customized and is presented to one or more appropriate delivery channel servers. The alert message is then delivered to the one or more subscribers.

19 Claims, 4 Drawing Sheets

METHOD AND SYSTEM FOR PROVIDING REAL-TIME ALERT NOTIFICATION

FIELD OF INVENTION

The present invention relates generally to the field of notification systems. More particularly, the present invention implements a multi-channel service platform for facilitating notification of alert messages to end users.

BACKGROUND OF THE INVENTION

Alert messaging is the process of reliably and securely circulating messages associated with an event to interested users. Due to the growth of Information Technology (IT) and telecommunications sectors in the recent past, the dissemination of alert messages has become prompt and easier.

Since existing business environment faces the challenge of reaching increasingly segmented markets, the design, delivery, and analysis of business communications needs to be tightly integrated across multiple alert notification channels. Telecommunication channels through which subscribers can receive alert messages may include email, fax, text messaging, instant messaging, broadband network and the like. Due to myriad software applications implemented by businesses and the vast demographics of customers, it may become necessary to segment alert messages so that the messages can be sent through channels based on business needs as well as customer preferences. Further, in order to maintain strong customer relationships, businesses need to time the messages precisely.

In light of the above, there exists a need for a system and method to provide real-time alert notification to subscribers.

SUMMARY OF THE INVENTION

A system and method for providing real time alert notification to end users is provided. The system includes a throttler configured to receive request for transmitting alert message generated by an alert originator application. The throttler is further configured to manage processing of the alert message including implementing priority based message processing. The system further comprises an alert notification module configured to transmit the alert message to one or more subscribers based on priority of alert originator application and delivery channels specified by the alert originator application.

In various embodiments of the present invention, the alert notification module comprises a gateway of Alert notification system configured to facilitate authentication and authorization of alert originator applications, acquisition of software tokens corresponding to alert originator applications, validation of software tokens and validation of alert requests. The alert notification module further comprises a profiler configured to receive validated alert request from the gateway, to acquire software templates corresponding to alert messages and to customize alert messages based on the templates. An output adapter in the module is configured to send alert messages to a suitable delivery server for transmission to intended recipients.

In various embodiments of the present invention, the alert notification module comprises a token generator configured to generate software tokens corresponding to alert originator applications, a token validator configured to validate software tokens and a request validator configured to validate an alert message request.

In various embodiments of the present invention, the method for providing real-time alert message to one or more subscribers includes initiating request for transmitting an alert message and determining whether the alert message has an associated token. In case the alert message has an associated valid token, token associated with the alert message is validated. Thereafter, the alert message request I validated and subscriber preferences and end point identities are obtained from a repository. One or more software templates according to specified delivery channels are applied to the alert message and the message is customized based on the templates. Subsequently, the alert message is relayed to one or more appropriate delivery servers and is delivered to one or more subscribers. In an embodiment of the present invention, the message may be delivered to one or more alert receiver applications.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purpose of clarity, details relating to technical material that is known in the technical fields related to the invention have been briefly described or omitted so as not to unnecessarily obscure the present invention.

The method and system of the present invention provides a robust carrier grade service platform that supports multiple in-bound interfaces and provides capability to deliver the messages through disparate communication channels. Further, the service platform is configured to customize an originated alert message based on an appropriate delivery channel by adapting the alert message format in accordance with the delivery channel selected for transmitting the message. For security purposes and in order to control cost which is linked to number of alert messages sent, the service platform is configured to validate, authorize and audit alert messages. Thus the present invention provides a unified alert notification service platform across multiple channels and multiple media types. The service platform may be integrated with any service provider or enterprise.

Additionally, the system and method of the present invention incorporates capability for prioritizing alert messages which is implemented by sharing of a software token with an alert originator application. Details of the present invention would now be discussed in context of embodiments as illustrated in the accompanying drawings.

Figure 1:
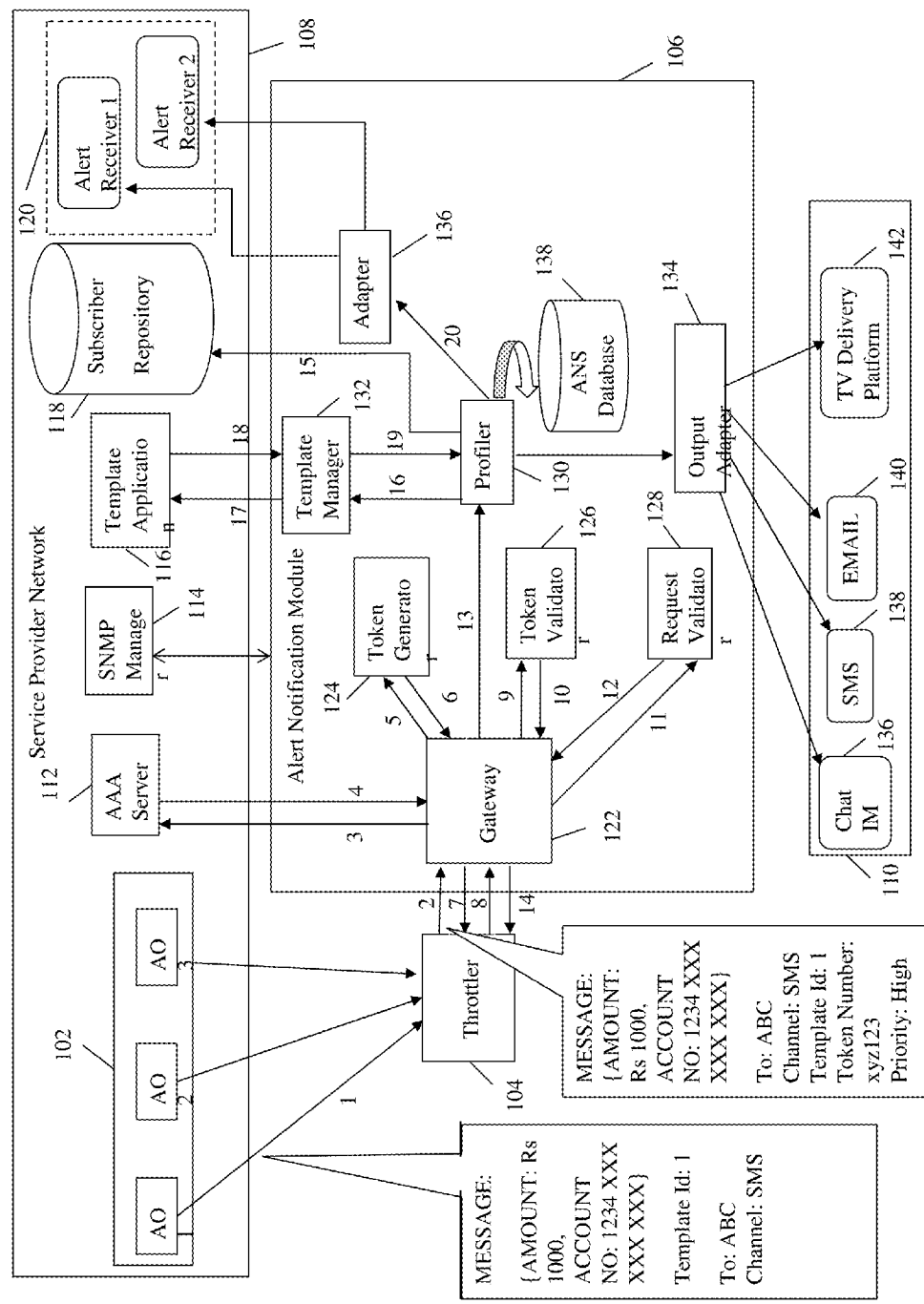
FIG. 1 depicts a system architecture illustrating elements of an alert notification system interacting with various telecommunication channels for providing alert messages to users, in accordance with an embodiment of the present invention.

FIG. 1 is a system architecture illustrating elements of an alert notification system interacting with various delivery communication channels for providing alerts to users, in accordance with an embodiment of the present invention. The system architecture comprises an alert originator module 102 which is a software module comprising alert originator applications AO1, AO2 and AO3 configured to generate alert messages. In an embodiment of the present invention, an alert message is a message associated with a product or service offered by an organization to interested users. Alert messages generally include electronic content providing information related to specific features of the product or service. For example, a user subscribing to an organization offering a class of products may receive software alerts related to new products or features of a particular product. In another example, an alert message may include a message provided by an organization such as a utility services provider that provides electronic information about utilities existing in a particular geographic area. In an embodiment of the present invention, the alert originator module 102 may be part of an organization's software framework. In an example, the alert originator module 102 is incorporated as an integral part of a software application hosted by an organization that provides information to subscribers regarding a product or service, the alert originator module 102 being configured to generate alert messages relevant to the application. In another example, the alert originator module 102 is external to an application relevant to a product or service and is configured to generate alert messages. One or more of the alert originator applications AO1, AO2 and AO3 include mechanisms to independently generate alert messages for their respective applications.

The system and method of the present invention comprises an arrangement of software components configured to provide secure, real-time notification of alert messages generated by alert originator applications. The system of the invention is intelligent enough to automatically customize and format alert messages according to alert originator application and delivery communication channel for delivering the message. Primary components of the alert notification system of the present invention include a throttler 104 and an alert notification module 106. The throttler 104 is a software component of alert notification system that manages processing of alert messages generated by alert originator applications AO1, AO2 and AO3. Tasks undertaken by the throttler 104 for managing alert requests include facilitating authentication and authorization of alert originator applications implementing token based processing of alert messages. In an embodiment of the present invention, the throttler 104 resides in the alert originator module 102. In another embodiment of the present invention, the throttler 104 resides external to the alert originator module 102 which acts as an interface between the alert originator module 102 and the alert notification module 106.

As shown in the figure, the alert notification module 106 is operationally connected to a service provider network 108 and a delivery channel service provider 110. The service provider network 108 is an enterprise or communication service provider or a hosted service. Examples of service provider network 108 may include, but are not limited to, a Cellular Network, Internet, Broadband Network, Cable Network, Public Switched Telephone Network (PSTN), an enterprise network etc. In an embodiment of the present invention, the service provider network 108 comprises the alert originator module 102, an Authentication, Authorization and Accounting (AAA) Server 112, a Simple Network Management Protocol (SNMP) Manager 114, a Template Application Module 116, a Subscriber Repository 118 and one or more alert receiver applications 120. In an embodiment of the present invention, the one or more alert receiver applications 120 are applications configured to receive alert messages from the alert notification module 106.

The alert notification module 106 operates in conjunction with the aforementioned components of the service provider network 108 for relaying alert messages to subscribers or one or more alert receiver applications 120 of the service provider network 108 through the Delivery Channels service provider 110. In various embodiments of the present invention, the throttler 104, the alert notification module 106, the service provider network 108, one or more alert receiver applications 120 and the delivery channels service provider 110 are independent software applications which are networked using Internet Protocol (IP) networks and communicate with each other using web services.

The figure depicts processing flow for delivering real-time alert messages to users of telecommunication services that are subscribed to the service provider network 108. In an embodiment of the present invention, the throttler 102 first attempts to acquire a software token for each alert originator application. A software token is an authentication code assigned in real-time to an application attempting to access a service. In an embodiment of the present invention, each alert originator application has a token assigned to it which is used for accessing the alert notification system.

As shown in the figure, Flow 2 indicates the throttler 104 attempting to acquire a token for the alert originator application AO1 by sending a web service request to a gateway 122 of the alert notification module 106. The process of assigning a token is initiated by the throttler 104 by sending details of the application AO1 along with the request. In an embodiment of the present invention, details sent include username and password associated with the application. Upon receiving token request, the gateway 122 transmits authentication and authorization request to Authentication, Authorization and Accounting (AAA) server 114 as illustrated by Flow 3. The gateway 122 is a node that is configured to interact with various network components in order to transport data between them. The gateway 122 supports multiple switching and networking protocols for facilitating transfer of data between user applications and the service provider network 108. In an embodiment of the present invention, communication between the gateway 122 and the AAA server 112 is implemented using Remote Authentication Dial-In User Service (RADIUS) protocol. The AAA server 112 inspects credentials such as username and password of the alert originator application AO1. The AAA server 112 sends a response to the gateway 122. Upon successful authentication and authorization of user credentials, the gateway 122 submits a request to a token generator 124 as depicted by Flow 4 for generating a token corresponding to the alert originator application AO1. The token generator 124 thereby generates a token (a set of alphanumeric characters) that stipulates values of parameters corresponding to AO1 that are later used by components of the alert notification module 106 and the throttler 104 for processing alert requests originating from AO1. Examples of parameters stipulated to be associated with an alert originator application may include, but are not limited to, request count, alert request rate, priority, format of message etc. Request count indicates number of requests associated with an application, priority indicates level of precedence given to an application compared to other applications, request rate indicates number of alert requests originating from an application within a certain period of time and type of format indicates message format to be used for delivering alert request to subscriber. Format of a message is dependent upon the type of delivery channel through which alert message is to be sent. The token generator 124 may assign values for request count, alert request rate, priority etc. based on the application for which the token is generated. In an exemplary embodiment, for a "DEBIT TRANSACTION" application for banking customers, the token generator 124 may assign priority value for alert requests as "HIGH" as compared to alert requests generated from "CHANGE OF ADDRESS" application for which the priority value assigned may be "LOW".

After generating a token, the token generator 124 responds to token generation request with a token. On receiving token from the token generator 124, the gateway 122 assigns the token to the throttler 104. The gateway 122 passes the token to the throttler 104 only upon successful authentication and authorization. In case the authentication and authorization fails, token request by the throttler 104 will be responded with an unauthorized/unauthenticated error code. In certain scenarios, even though user credentials may be successfully authenticated by the AAA server 112, the gateway 122 may invalidate the token when a particular parameter is inconsistent. For example, if alert request count has reached beyond a stipulated limit, the gateway 122 invalidates the token and provides an unauthorized/unauthenticated error code to the throttler 104.

Once a token corresponding to an alert originator application has been assigned, the throttler 104 is configured to receive requests for transmitting alert messages from the particular application. In various embodiments of the present invention, the throttler 104 obtains software token corresponding to each alert originator application in the alert originator module 102 and is configured to maintain a record of tokens associated with each application. As shown in the figure, when an alert message is generated by application AO1, the generated message is sent to the throttler 104 in order to be transmitted to subscribers in the service provider network 108 or to one or more alert receiver applications 120. In order for alert notification system to process the alert message, the message includes metadata specifying the details identifying recipient of the message, subscriber to which message is to be delivered and content of the message. As shown in the figure, the application AO1 generates an alert notification to be sent through Short Message Service (SMS) to a subscriber 'ABC' with "MESSAGE" details like "AMOUNT" and "ACCOUNT NO".

Metadata associated with an alert message is specified by the following fields: MESSAGE, TO, Template ID and Channel. Alert Message generated by the application AO1 and indicated by Flow 1 in the figure includes the following detail-specifying fields: (MESSAGE:)→Alert message content data, (To:)→Subscriber Identifier, (Template ID:)→Template Identifier and (Channel:)→Channel Identifier. Subscriber Identifier identifies a subscriber to which alert message is to be delivered. A subscriber is a customer who is configured to receive electronic messages such as emails, text messages, chat, voice and video messages, fax messages etc. Typically, a subscriber is configured to receive messages through one or more telecommunication channels such as cellular networks, Internet, Broadband Network, Cable Network, Public Switched Telephone Network (PSTN) etc. Channel Identifier indicates channel through which alert message is to be delivered to a subscriber. In an embodiment of the present invention, the delivery channel service provider 110 includes multiple channels such as Email, Chat, Short Message Service (SMS) etc. for delivering alert messages. Template Identifier includes identifier for accessing template for transforming originated alert message into an appropriate readable format. In the example referred in the figure, metadata corresponding to alert message generated by AO1 includes amount credited into a subscribers account by the field: MESSAGE→"{AMOUNT: Rs 1000, ACCOUNT NO: 1234 XXX XXX XXX}. Data corresponding to the field TEMPLATE ID includes an identification code that is used by alert notification module 106 for formatting the message in order to be in a readable format depending on delivery channel to be used. Profiler 130 with the "Template ID" will format MESSAGE and convert it in to a readable format depending upon the delivery channel. For example, using an appropriate template the message may be converted as "Your XYZ bank ACCOUNT NO: 1234 XXX XXX XXX" is credited with AMOUNT: Rs 1000 for sending an SMS message. The throttler 104 attaches appropriate token to alert message received from the application AO1 and makes a web service request to the gateway 122 as indicated by Flow 2.

The gateway 122, upon receiving web service request from the throttler 104 relays the request to the token validator 126. If token corresponding to the application A01 has been received for the first time, the token validator 126 stores the token in its cache. For validating the token, the token validator 126 applies rules to the request for further processing of request based on token parameter values. For example, if request count for the application exceeds the specified value of request count, the token validator 126 terminates processing of the alert request and replies back with appropriate status error code. Further, based on template identifier, the token validator 126 identifies and assigns template corresponding to type of message format to be used for the message, for example, if the message is to be sent through SMS, corresponding template to be attached is identified and specified by the token validator 126. After token validation and assignment of characteristics, the token validator 126 replies back to the gateway 122 as depicted by Flow 10. Thereafter, the alert request is passed to a request validator 128 that validates appropriate setting of values of request parameters with respect to the application originating the alert request. After validation of request parameter values, validation response is sent back to the gateway 122. After receiving the validation response, the gateway 122 passes the alert message to a profiler 130 for alert message processing. The alert message is sent along with the token parameters to the profiler 130 as indicated by Flow 13. After sending alert message to the profiler 130, the gateway 122 assigns a unique message identifier to the alert message. The gateway 122 then sends message identifier along with message processing status details to alert originator application A01 through the throttler 104 as depicted by Flow 14. Following the receipt of alert message from the gateway 122, the profiler 130 treats the alert message processing as transaction and updates ANS database 138 which is a repository operationally integrated with the profiler 130.

Following receipt of alert message from the gateway 122, the profiler 130 structures processing of alert message based on its targeted destination. In various embodiments of the present invention, the alert notification module 106 is integrated with the Subscriber Repository 118. The Subscriber Repository 118 includes subscriber details such as subscriber identification details (Email addresses, Mobile Numbers, Chat Ids etc.). The Subscriber Repository 118 further comprises subscriber preferences such as preferred channels for receiving alerts. The profiler 130 obtains subscriber preferences and end point identities from the Subscriber Repository 118 and performs message formatting. For performing message formatting, the profiler 130 first identifies type of channel through which alert message is to be sent. Then, it obtains template for the identified channel. The profiler 130 uses "TEMPLATE ID" associated with the alert message for identifying and retrieving template related to the type of channel through which alert message is to be sent. The profiler 130 first sends a request to a Template Manager 132. The Template Manager 132 retrieves template corresponding to the identified channel from its cache and delivers it to the profiler 130. In case, the required template is not available in cache, the Template Manager 130 downloads the required template from the Template Application Module 116. In various embodiments of the present invention, the Template Application Module 116 comprises templates corresponding to specific alert originator application and the type of delivery channel.

After retrieving template corresponding to an alert message, the Template Manager 132 provides the template to the profiler 130. Based on the received template, the profiler 130 formats the alert message. In an embodiment of the present invention, formatting of the alert message is performed by customizing the template based on delivery channel specified by the token parameter. Upon formatting the alert message and identifying the end point identity, such as mobile number of intended recipient, the alert message is sent to output adaptor 134. The output adapter 134 is a module comprising software adaptors configured to implement protocols associated with various delivery channels in the Delivery Channels service provider 110. Examples of protocols supported by software adaptors include, but are not limited to, Extensible Messaging and Presence Protocol (XMPP) protocol, Internet Message Access Protocol (IMAP), Short Message Service Center (SMSC) protocol, Simple Mail Transfer Protocol (SMTP), Enhanced TV Binary Interchange Format (EBIF) format etc. The output adaptor 134 is configured to identify the delivery channel through which the message needs to be delivered.

As shown in the figure, the output adapter 134 opens communication channels with an appropriate delivery server in the Delivery Channels Module 110 using an appropriate protocol for transmitting alert message. The Delivery Channels service provider 110 comprises servers for multiple delivery modes through which alert messages can be transmitted to subscribers. In an embodiment of the present invention, the delivery servers include Chat server 136, SMS server 138, Email server 140 and TV Delivery Platform Server 142. A delivery server upon receiving alert message from the output adapter 134 delivers the message to the intended subscriber. The profiler 130 also provides delivery status information to the ANS Database 138. The ANS Database 138 is configured to archive all alert message transaction details for later retrieval. Further, the ANS Database 138 is configured to act as a repository for configuring components of the alert notification module 106.

In various embodiments of the present invention, one or more components in the alert notification module 106 sends trap notifications using Simple Network Management Protocol to the SNMP Manager 114. The traps are sent to notify the SNMP Manager 114 about any errors found in processing an alert message or any other issues faced. A system administrator can view details of traps in the SNMP Manager 114.

In various embodiments of the present invention, the Service Provider Network comprises one or more alert receiver applications 120 which are configured to receive alerts from alert originator applications. The one or more alert receiver applications 120 interfaces with the profiler 130 through an adapter 136.

Figure 2:
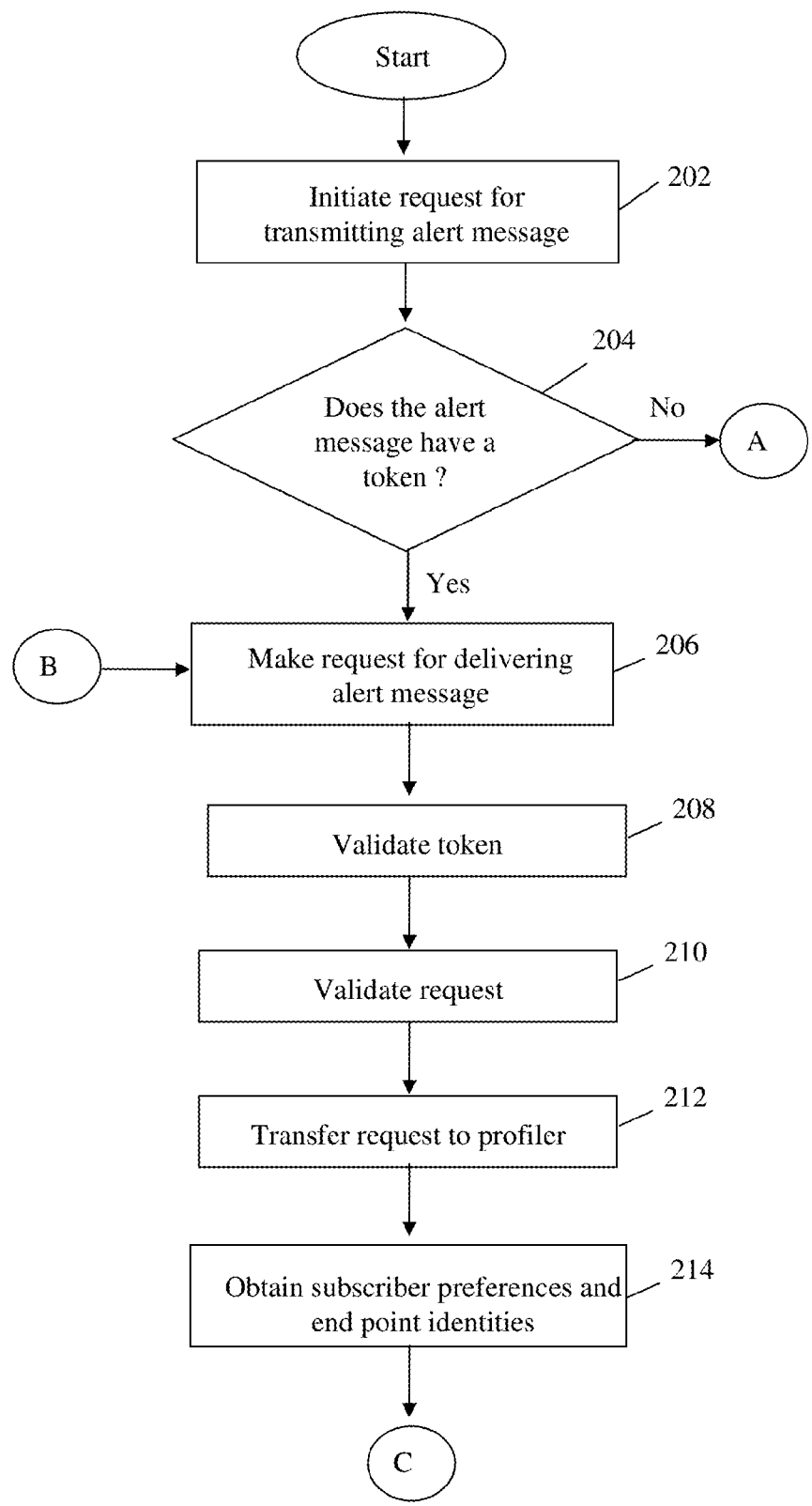
FIGS. 2, 3 and 4 depict a flowchart illustrating method steps for providing real-time alert notification.
Figure 3:
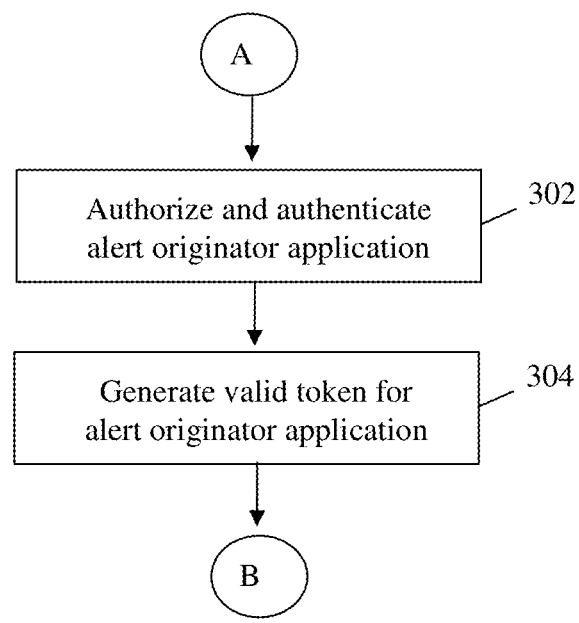
Figure 4:
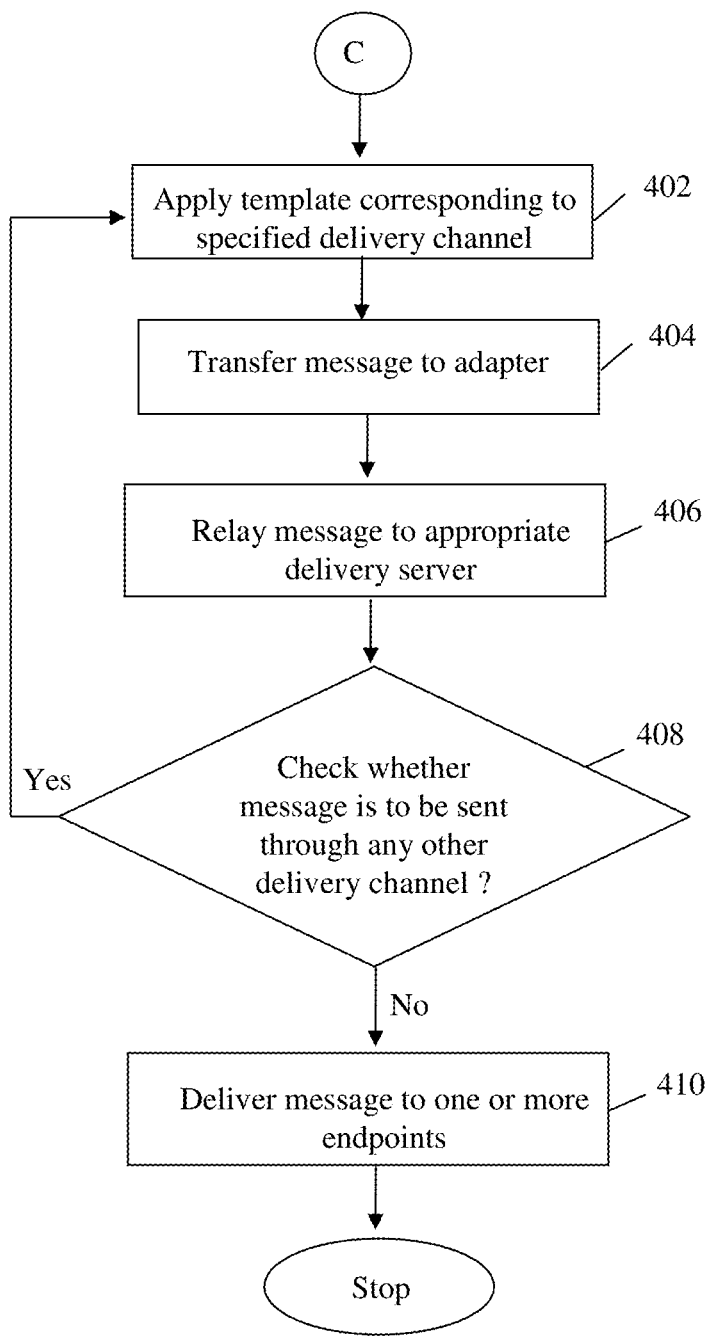

FIGS. 2, 3 and 4 depict a flowchart illustrating method steps for providing real-time alert notification. As shown in the figure, at step 202, a request is initiated for transmitting an alert message. The request may be initiated by any software application configured to generate an alert request. At step 204, a throttler application first determines whether alert request to be transmitted has an associated token. In case, a token exists for the alert request, at step 206, the throttler makes a request to an alert notification module for delivering the alert message.

If at step 204, it is determined that the alert message does not have a token, a request is made to the alert notification module to generate a token corresponding to the alert originator application. At step 302, the alert notification module facilitates authorization and authentication of software application generating the alert message using a AAA server in the service provider network. Upon validation of the alert originator application, a token is assigned to the application at step 304 and the process flow is transferred to step 206.

Upon receiving the request, at step 208, token associated with the alert request is validated by the alert notification module. Confirming validity of token includes determining whether conditions related to the alert request are in conformance to token parameter values. After performing validation of token, the method of the present invention performs validation of alert request at step 210. Once the alert request is validated, at step 212, the request is transferred to a profiler module for further processing.

In an embodiment of the present invention, the profiler module is networked with a servicer provider network. At step 214, the profiler imports subscriber preferences and end point identities from a subscriber repository in the servicer provider network. Subscriber preferences may include format preferences for receiving alert messages. After importing subscriber preferences and end point identities, at step 402, the profiler applies a suitable template corresponding to the specified delivery channel in the token and then, at step 404 transfers the message to be delivered to an output adapter. The message is delivered to an appropriate delivery server at step 406, and at step 408 it is checked whether the message is to be delivered through other delivery channels. In case more delivery channels are specified in the alert request from alert originator, then process flow reverts to step 402 and templates corresponding to additional delivery channels are applied to the message.

Finally, at step 410, the alert message is delivered to one or more endpoints based on specified delivery channels.

The method and system for providing real-time alert notification as described in the present invention or any of its embodiments, may be realized in the form of a computer system. Typical examples of a computer system include a general-purpose computer, a programmed microprocessor, a micro-controller, a peripheral integrated circuit element, and other devices or arrangement of devices that are capable of implementing the steps that constitute the method of the present invention.

The computer system typically comprises a computer, an input device, and a display unit. The computer typically comprises a microprocessor, which is connected to a communication bus. The computer also includes a memory, which may include Random Access Memory (RAM) and Read Only Memory (ROM). Further, the computer system comprises a storage device, which can be a hard disk drive or a removable storage drive such as a floppy disk drive, an optical disk drive, and the like. The storage device can also be other similar means for loading computer programs or other instructions on the computer system.

The computer system executes a set of instructions that are stored in one or more storage elements to process input data. The storage elements may also hold data or other information, as desired, and may be an information source or physical memory element present in the processing machine. The set of instructions may include various commands that instruct the processing machine to execute specific tasks such as the steps constituting the method of the present invention.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

What is claimed is:

1. A system for providing real-time alert message to one or more subscribers registered to receive messages through one or more delivery channels, the system comprising:
    a throttler configured to:
        receive an alert message from at least one alert originator application of one or more alert originator applications, wherein the alert message is generated by the at least one alert originator application;
        determine if a token is present in the alert message, wherein the token is assigned to each alert originator application of the one or more alert originator applications and is included in the alert message;
        initiate a request to an alert notification module for delivering the alert message if it is determined that the token is present in the alert message; and
        initiate a request to the alert notification module to generate a token corresponding to the at least one alert originator application if it is determined that the token is not present in the alert message; and
    the alert notification module configured to perform one of:
        transmit the alert message to one or more subscribers based on values of parameters corresponding to the at least one alert originator application and delivery channels specified by the at least one alert originator application when the request to deliver the alert message is initiated by the throttler; and
        generate a token when the request to generate the token is initiated by the throttler, wherein to generate the token the alert notification module is further configured to:
            receive, from the throttler, a username and a password associated with the at least one alert originator application;
            authenticate and authorize the username and a password associated with the at least one alert originator application;
            if the authentication and authorization of the username and the password is successful, generate a token by assigning values of parameters corresponding to the at least one alert originator, wherein the parameters comprise: number of alert messages that can originate from the at least one alert originator application, number of alert messages that can originate from the at least one alert originator application within a predefined period of time, priority of the at least one alert originator application, from which the alert message has originated, in comparison to other alert originator applications, and format of the alert message originated from the at least one alert originator application,
            further wherein when the alert message is received for delivery and if it is determined, from the token received with the alert message, that value of a parameter has reached beyond the assigned value, the token gets invalidated and an error code is sent to the throttler indicating that the token is unauthorized; and
            assign the generated token to the at least one alert originator application.

2. The system of claim 1, wherein the alert originator application is an integral part of a service provider network that services the one or more subscribers.

3. The system of claim 2, wherein the alert notification module is configured to transmit the alert message to one or more alert receiver applications hosted in the service provider network.

4. The system of claim 1 further comprising a delivery channels service provider comprising the one or more delivery channels for transmitting the alert message.

5. The system of claim 4, wherein the one or more delivery channels comprise at least one of an SMS text messaging server, an instant messaging server, an Email server and a television delivery platform server.

6. The system of claim 1, wherein the service provider network is at least one of a Cellular Network, the Internet, a Broadband Network, a Cable Network, an enterprise and a Public Switched Telephone Network.

7. The system of claim 1, wherein the throttler is a software module which is part of the alert originator application generating the alert message.

8. The system of claim 1, wherein the throttler is a software module located external to the alert originator application generating the alert message and acts as an interface between the alert originator application and the alert notification module.

9. The system of claim 1, wherein the service provider network comprises an Authentication, Authorization and Accounting (AAA) server configured to authenticate and authorize the username and a password associated with the at least one alert originator application for transmitting the alert messages, further wherein the AAA server communicates over Remote Authentication Dial-In User Service (RADIUS) protocol.

10. The system of claim 1, wherein the alert notification module comprises:
    a gateway of Alert notification system configured to: facilitate authentication and authorization of alert originator applications, acquisition of tokens corresponding to alert originator applications, validation of tokens and validation of alert requests, and assign a unique identifier to the at least one alert originator application, wherein the gateway is further configured to send the unique identifier to the at least one alert originator application via the throttler;
    a profiler configured to receive validated alert request from the gateway, to acquire templates corresponding to alert messages and to customize alert messages based on the templates; and
    an output adapter configured to send alert messages to a suitable delivery server for transmission to intended recipients.

11. The system of claim 10, wherein the profiler is configured to import subscriber preferences from a repository in the service provider network in order to customize the templates, further wherein the templates are acquired from one of: a template manager in the alert notification module and a template application module in a service provider network.

12. The system of claim 1, wherein the alert notification module further comprises:
- a token generator configured to generate tokens corresponding to alert originator applications, wherein the token generator is further configured to stipulate values of parameters corresponding to the at least one alert originator application;
- a token validator configured to validate tokens, wherein to validate the tokens, the token validator applies predefined rules on the values of parameters corresponding to the at least one alert originator, further wherein the token validator stores the tokens in cache memory associated with the token validator when the token is received for the first time; and
- a request validator configured to validate the alert message, wherein the request validator validates the alert message based on the values of parameters corresponding to the at least one alert originator.

13. A method for providing real-time alert message to one or more subscribers registered to receive messages in a telecommunications service provider network, the method comprising:
- receiving an alert message from at least one alert originator application of a plurality of alert originator applications, wherein the alert message is generated by the at least one alert originator application;
- determining if the received alert message has a token, wherein the token is assigned to each alert originator application of the one or more alert originator applications and is included in the alert message;
- initiating a request to an alert notification module for delivering the alert message if it is determined that the alert message has the token; and
- initiating a request to the alert notification module to generate a token corresponding to the at least one alert originator application if it is determined that the alert message does not have the token;
- transmitting the alert message to one or more subscribers based on values of parameters corresponding to the at least one alert originator application and delivery channels specified by the at least one alert originator application when the request to deliver the alert message is initiated; and
- generating a token when the request to generate the token is initiated, wherein the step of generating the token further comprises:
  - receiving a username and a password associated with the at least one alert originator application;
  - authenticating and authorizing the username and a password associated with the at least one alert originator application;
  - generating a token, if the authentication and authorization of the username and the password is successful, by assigning values of parameters corresponding to the at least one alert originator application,
    - wherein the parameters comprise: number of alert messages that can originate from the at least one alert originator application, number of alert messages that can originate from the at least one alert originator application within a predefined period of time, priority of the at least one alert originator application, from which the alert message has originated, in comparison to other alert originator applications, and format of the alert message originated from the at least one alert originator application,
  - further wherein when the alert message is received for delivery and if it is determined, from the token received with the alert message, that value of a parameter has reached beyond the assigned value, the token gets invalidated and an error code is sent to the throttler indicating that the token is unauthorized; and
  - assigning the generated token to the at least one alert originator application.

14. The method of claim 13 further comprising:
validating alert originator application, if it is determined that the alert message does not have a valid token.

15. The system of claim 1, wherein the throttler receives an error message, from the alert notification module, in response to the request to generate the token corresponding to the at least one alert originator application when the authentication and authorization of the username and the password associated with the at least one alert originator application fails.

16. The system of claim 1, wherein the alert message comprises associated metadata specifying content of the alert message, a subscriber to which the alert message is to be delivered, a channel through which the alert message is to be delivered, and a template identifier for accessing a template for transforming the alert message into a predefined format based on the channel through which the alert message is to be delivered.

17. The system of claim 1 further comprising a Simple Network Management Protocol (SNMP) manager configured to receive trap notifications from the alert notification module, wherein the trap notifications notify the SNMP manager about errors occurred in processing the alert messages by the alert notification module.

18. The system of claim 1, wherein the alert notification module is further configured to transmit the alert message received from the at least one alert originator application to one or more subscribers based on the values of parameters corresponding to the at least one alert originator application and delivery channels specified by the at least one alert originator application when the request to generate the token is initiated by the throttler.

19. The method of claim 13 further comprises transmitting the alert message received from the at least one alert originator application to one or more subscribers based on the values of parameters corresponding to the at least one alert originator application and delivery channels specified by the at least one alert originator application when the request to generate the token is initiated.

* * * * *